United States Patent [19]

McKeever

[11] 3,708,778
[45] Jan. 2, 1973

[54] WALL CLAMP FOR ELECTRICAL CORDS

[76] Inventor: Earl J. McKeever, 443 East 46th Avenue, Vancouver, 15 British Columbia, Canada

[22] Filed: Dec. 16, 1971

[21] Appl. No.: 208,721

Related U.S. Application Data

[63] Continuation-in-part of Ser. No. 26,280, April 7, 1970, abandoned.

[30] Foreign Application Priority Data

April 1, 1970 Canada..................................078,789

[52] U.S. Cl. .................................339/75 P, 24/130
[51] Int. Cl. ................................................H01r 13/58
[58] Field of Search....339/103, 95, 97, 75, 105, 104; 24/130, 264, 81 F, 137

[56] References Cited

UNITED STATES PATENTS

| 2,913,791 | 11/1959 | Martin | 339/104 X |
| 1,258,181 | 3/1918 | Brown | 24/130 |
| 3,538,484 | 11/1970 | Passofiume | 339/75 P X |

FOREIGN PATENTS OR APPLICATIONS

| 564,766 | 11/1932 | Germany | 339/105 |
| 323,268 | 12/1929 | Great Britain | 339/105 |

Primary Examiner—Richard E. Moore
Attorney—Lyle G. Trorey

[57] ABSTRACT

A wall clamp assembly secured to a wall to retain a plug of an electrical appliance cord in a socket of a wall outlet. Cord is retained in a v-shaped opening of a clamping means at an outer end of a hinged arm of the assembly, the v-shaped opening having side walls with serrations or ridges. Load on the cord is sustained by the clamping means, the arm rotating to follow limited movement of the cord.

10 Claims, 9 Drawing Figures

PATENTED JAN 2 1973   3,708,778
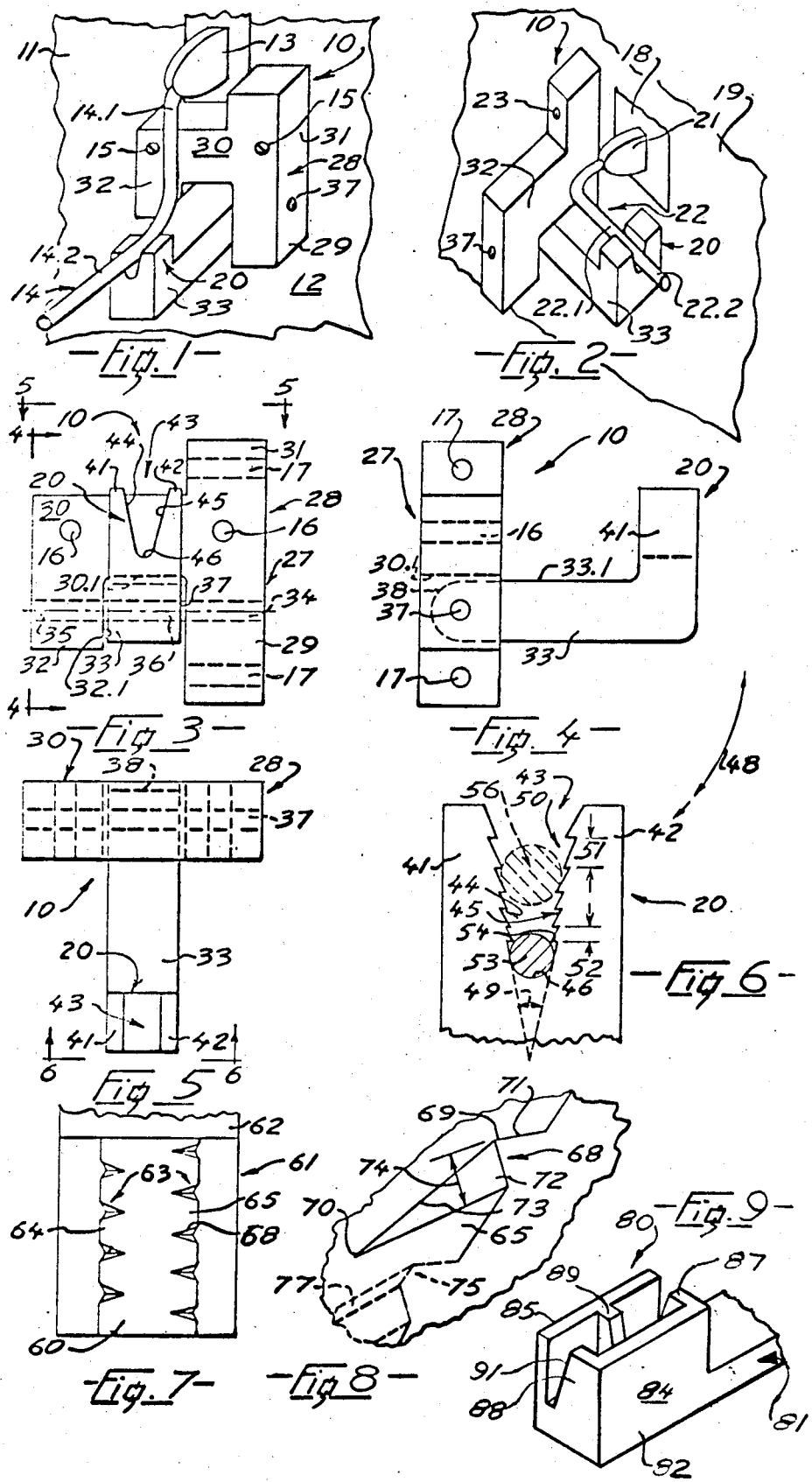

3,708,778

WALL CLAMP FOR ELECTRICAL CORDS

CROSS-REFERENCES TO RELATED APPLICATIONS

This is a continuation-in-part application of my co-pending application Ser. No. 26,280, filed Apr. 7, 1970, and now abandoned.

BACKGROUND OF THE INVENTION

1. Field of the Invention

The invention relates to a clamp that is used to retain electrical plugs in wall outlets.

2. Prior Art

Commonly a plug at an end of a cord leading to an electric appliance has a tendency to being inadvertently pulled from the socket when the appliance is moved. Various devices have been invented directed to preventing this.

U.S. Pat. No. 2,659,059 issued to Johnson in 1953 is a retainer for electrical plugs, the retainer being screwed to a standard outlet and having provision for accepting a limited range of plug sizes and shapes. This patent discloses a rigid retainer that requires unscrewing and screwing of a screw to accommodate a plug in the retainer. U.S. Pat. No. 3,102,922 issued to De Lashmutt in 1963 discloses a resilient retainer which is also screwed to a standard electrical outlet. The retainer in De Lashmutt is adapted to accept cords of different diameters but produces excessive cord bending when used with a thick cord, which bending results in untimely damage.

Both of the above devices perform well and are adequate for a range of plug sizes and cord thicknesses.

SUMMARY OF THE INVENTION

The present invention relates to a wall clamp adapted to retain a plug of a cord in a socket. The clamp is adapted to be secured adjacent the socket and, with slack in a portion of the cord adjacent the plug, the cord is retained in a clamping means of the wall clamp which means is free to follow limited lateral movements of an appliance connected to the cord when a portion of the cord between the clamp and the appliance tightens and the appliance is moved laterally relative to the socket. Because the cord is retained in the means of the wall clamp, load on the cord is carried mainly by the wall clamp so that the plug has little tendency to be pulled from the socket.

A detailed disclosure following, related to drawings, gives exemplification of preferred embodiment of the invention which however, is capable of expression in structure other than that particularly described and illustrated.

DESCRIPTION OF THE DRAWINGS

FIG. 1 is a perspective of a wall clamp assembly according to the invention, the assembly being secured to the wall in a first position, FIG. 2 is a perspective of the assembly shown secured to the wall in a second position, FIG. 3 is a front elevation of the assembly, FIG. 4 is a side elevation of the assembly as seen from 4—4 FIG. 3, FIG. 5 is a top plan of the assembly as seen from 5—5 FIG. 3, FIG. 6 is a fragmented detail of a clamping means as seen from 6—6 FIG. 5, portions of cord shown in section, FIG. 7 is a fragmented detail top plan of a further clamping means as shown in FIG. 5, FIG. 8 is a detail perspective of a portion of cord retaining means of FIG. 7.

FIG. 9 is a fragmented detailed perspective of an alternative clamping means.

In the detailed disclosure horizontal and vertical directions relate to the assembly as viewed in FIGS. 3 and 4.

DETAILED DISCLOSURE

FIG. 1

A wall clamp assembly, generally 10, is shown in use in a first position, being secured to a wall 12 adjacent a face plate of a common electrical outlet 11. The outlet 11 has a socket which accepts a plug 13 at an end of an electrical cord 14 of a portable electrical device such as an electrical power tool or toaster, hereinafter appliance. The assembly is secured to the wall by screws 15. Means 20 of the assembly 10 retains the cord so that the plug is not inadvertently pulled out of the socket. A cord portion 14.1 between the plug and the means 20 is slack, extending generally at right angles to the wall when viewed from above. A cord portion 14.2 extending from the means 20, hereinafter a clamping means, to the appliance may or may not be tight but, because the cord is held in the clamping means, load on the portion 14.2 is not transmitted to the plug 13, and thus does not tend to pull the plug out of the socket.

FIG. 2

In a second position, the clamp assembly 10 is shown adjacent a face plate of an electrical outlet 18, the assembly being secured to a wall 19. The outlet 18 has a socket which accepts a plug 21 at an end of a cord 22, the cord being retained in the clamping means 20 as before described. A portion 22.1 of the cord between the plug and the clamping means is slack and a portion 22.2 from the clamping means to the appliance may be tight. The assembly is secured to the wall by screws 23.

Tight herein refers to a condition of a cord that, without the clamping means 20, exerts a force on the plug when the appliance is at a distance from the plug such that little or no slack is in the cord. The force may arise because of stiffness such that the cord remains bent unless excessive load is applied to straighten it. A flexible cord becomes straightened under a smaller load than that required to straighten a stiffer cord, however the stiffer cord whilst bent may, if the appliance is moved, tend inadvertently to pull the plug from the socket. Thus tightness in this context does not refer necessarily to straightness.

FIGS. 1, 3, 4, and 5

The assembly 10 has a body 27 having a rectangular part 28 with a lower portion 29 and an upper portion 31. In FIGS. 1, 2, and 3, the body 27 is shown disposed vertically. An L-shaped extension 30 has an arm extending outwards of the part 28, the arm having a lower wall 30.1 and a downwardly inclined projection 32. The projection 32 has an inner wall 32.1 spaced from the lower portion 29 defining in part a space accepting an arm 33. The clamping means 20 is provided at an outer end of the arm 33, the arm having an upper wall 33.1. The lower portion 29 has a hole 34 which is aligned with a hole 35 in the projection 32. The arm 33 has a hole 36 at an inner end 38, and when the arm 33 is between the projection 32 and the portion 29 the holes 34, 35, 36, are aligned so that a shaft 37 passing through the holes journals the arm 33 for rotation about the shaft. Holes 16 and 17 are provided for the screws 15 and 23 respectively, for securing the body 27 to the wall.

As seen in FIG. 3, the clamping means 20 has two arms 41 and 42 with sloping inner side walls 44 and 45 converging to a curved apex 46, the sidewalls defining a v-shaped opening 43. As seen in FIG. 4, the arm 33 is free to rotate about the shaft 37 in a direction shown by an arrow 48, thus serving as a means for the arm, and with it the means 20, to follow limited movement of the appliance when the cord is tight. Rotation in an upward direction is limited by interference of the upper wall 33.1 of the arm 33 with the lower wall 30.1 of the L-shaped extension 30 of the part 28. Thus mounting of the arm 33 on the shaft 37 as above permits limited rotation of the arm about the shaft.

Depending on relative positions of the socket and of the appliance, the clamp assembly 10 can be mounted in an attitude which reduces forces on the clamp by permitting rotation of the arm 33 to follow limited movements of the cord. These movements tend to be about extreme positions of the appliance and reduce load which, otherwise, would be applied to the clamp. Movements of the appliance such that the arm 33 rotates are, hereinafter and in the claims, referred to as limited movements of the appliance laterally about the socket.

For optimum arm rotation the clamp can be inverted, or mounted sideways, relative to attitudes of the clamp as shown in FIGS. 1 and 2. Thus means are provided to secure the body 27 to the wall selectively with the arm below the socket, above the socket or on either side of the socket according to direction at which force tightening the cord is applied. Such rotation of the arm requires slack in the cord between the plug and the clamping means 20, as shown in FIGS. 1 and 2, otherwise load on the cord can be transmitted to the plug, inadvertently pulling it from the socket.

FIGS. 6, 7, and 8

As seen in FIG. 6, in the clamping means 20 the side walls 44 and 45 of the v-shaped opening 43 are inclined to each other at an angle 49 and, in a first means to retain the cord, the side walls have horizontally disposed serrations generally 50, the serrations having projecting spaced crests, spacing between the crests hereinafter being referred to as pitch. The crests are radiused so as not to damage the cord when it is inserted as later explained. Adjacent an upper edge of the sidewall 45 the pitch of the crests is designated 51, and adjacent a lower edge of the side wall 45, the crests have a pitch 52, in FIG. 6 the pitch 52 is shown as being less than the pitch 51. Serrations on the side wall 44 of the vee are as described with reference to the serrations 50 and crests on the side walls 44 are disposed opposite to crests on the side walls 45, as shown. There is thus a gradual diminishing of the pitch as the curved apex 46 is approached. As the pitch diminishes, relative projection of the crests from the side walls into the vee also diminishes, resulting in smaller crests. This structure provides means to accommodate cords of different diameters.

A cord of small diameter is designated 53 and shown in section adjacent the apex 46. Opposite crests 54 of the serrations at the lower edge of the side walls 44 and 45 deform the electrical cord and tend to retain it in the v-shaped opening. A cord of small diameter is thus retained within the v-shaped opening 43 by the crests 54 of the serrations which act as does a barb of a fish hook.

A cord 56 of large diameter, shown in section in broken outline, is held between the side walls 44 and 45 in a position outward from the apex relative to the cord 53 and is similarly retained in the v-shaped opening. Horizontal movement of the cord through the opening is also restricted by the serrations. The v-shaped opening 43 can thus accommodate a range of diameters of electrical cord. It is noted that the crests are shown as having sharp knife edges. Sharpness should be sufficient merely to deform the cord as above, but not so sharp as to damage the cord, a small radius being provided on the crests to reduce chance of damage. Cords having an outer casing with longitudinal flutes are gripped effectively by the serrations 50.

FIG. 7 shows an alternative means to retain a cord. An alternative v-shaped opening 60 is shown in an alternative clamping means 61 at an outer end of an alternative arm 62 shown fragmented. The v-shaped opening 60 has a plurality of tapering ridges 63 on inwardly sloping side walls 64 and 65 of the v-shaped opening 60. A typical ridge 68 in the opening 60, shown in detail in FIG. 8, has an upper end 69, a lower end 70, and two sloping side walls 71 and 72 converging to a crest 73, the sidewall 71 not being seen clearly in FIG. 8. At the end 69 of the ridge 68, the ridge projects a distance 74 from the sidewall 65. The lower end 70 is flush with the side wall 65, thus the sloping side walls of the ridge are triangular. The distance 74 is dependent on flexibility and diameter of the cord and crests of the ridge are radiused so that the cord is not damaged. An alternative ridge 75 is shown in broken outline, and differs from the ridge 68 by having a flattened crest 77, increasing surface area in contact with the cord. The alternative ridges 75 can be used in instances where sharp ridges, such as shown at 68, may damage the cord.

In FIG. 7, the ridges 63 are regularly spaced on each side of and along the v-shaped opening 60, a ridge on one side being centered between two ridges on opposite sides, in other words the ridges are staggered as shown. When a portion of electrical cord is inserted in the v-shaped opening, contact with the ridges alternates between one side of the cord and the other and, because of the staggered ridges 63, the cord follows an S-shaped path. With the cord embedded in the v-shaped opening, the ridges increase resistance to being pulled horizontally, and offer some resistance to pulling of the cord upwards, thus serving as means to retain the cord within the v-shaped opening.

In the v-shaped openings 43 and 60 retention of the cord by the side walls of the opening is augmented by either the crests or the ridges, cord retention against pulling along one axis, usually being greater than when pulling occurs in a direction at right angles. The load on the cord between the clamp and appliance is not sustained by the plug, thus little force tending to pull the plug from the socket is transmitted by the cord.

FIG. 9

An alternative clamping means 80 is provided at an outer end 82 of an arm 81, equivalent to the arm 33 of FIG. 4. The means 80 has two spaced upwardly extending parallel walls 84 and 85, the wall 84 having two tapered buttresses 87 and 88 extending inwards from an inner surface thereof, and the wall 85 having one tapered buttress 89 extending inwards and being staggered between two buttresses 87 and 88. The buttress 88 has a sloping inner edge 91, which with an inner surface of the wall 85, defines a v-shaped gap, having a minimum and a maximum width. The minimum and maximum widths are sufficient to accommodate a range of diameters of electrical cord similar to the v-shaped opening 43 (FIG. 6). The buttresses 87 and 89 come within the description of the buttress 88 and are not described.

When a cord (not shown) is inserted between the walls 84 and 85 it follows a generally sinusoidal path between the buttresses and portions of the opposing side walls. Thus the staggered buttresses and v-shaped gap between the buttresses and the side walls serve as a means to clamp the cord in an arm of the assembly.

I claim:

1. A wall clamp assembly (10) adapted to retain a plug (13,21) of an electrical appliance cord (14,22) in a socket of a wall outlet (11,18), the assembly including:
   a. means to secure the assembly to the wall,
   b. a rigid arm (33) having an inner end (38) and an outer end, the inner end being connected to the securing means permitting the arm to swing about the securing means,
   c. means (20) to clamp the cord at the outer end of the arm,
   constructed and arranged so that a force tightening the cord is taken up in the arm, with a slack portion of the cord between the arm and the plug so that the force is not transmitted to the plug tending to withdraw it from the socket, the arm swinging to follow limited movement of the appliance when the cord is tight.

2. Structure as defined in claim 1 in which the means to clamp the cord in an arm of the assembly includes
   i. a v-shaped opening (43,60) having sloping inner side walls (44,45; 64,65),
   ii. means to retain the cord within the v-shaped opening provided on the side walls of the v-shaped opening.

3. Structure as defined in claim 2 in which the means to retain the cord within the v-shaped opening provided on the side walls of the v-shaped opening includes a plurality of horizontally disposed serrations (50) having crests (57,58) provided at a pitch on the sloping inner side walls (44,45), the crests on each side wall being opposite to each other.

4. Structure as defined in claim 2 in which the means to retain the cord within the v-shaped opening provided on the side walls of the v-shaped opening includes a plurality of tapering ridges (63) each ridge having an upper end (69) projecting a distance (74) from the side wall of the v-shaped opening, a lower end (70) flush with the side wall of the v-shaped opening, the ridge having two sloping side walls converging to a crest (73), so that the ridges deform the cord and retain the cord within the v-shaped opening.

5. Structure as defined in claim 2 in which the means to retain the cord within the v-shaped opening provided on the side walls of the v-shaped opening includes a plurality of tapering ridges (75), each ridge having a flattened crest (77) and projecting a distance from side walls of the v-shaped opening so as to retain the cord within the v-shaped opening.

6. Structure as defined in claim 4 in which the ridges are staggered along sides of the v-shaped opening.

7. Structure as defined in claim 5, in which the ridges are staggered along sides of the v-shaped opening.

8. Structure as defined in claim 1 wherein the inner end of the arm is hinged on a shaft (37) so that the arm is free for limited rotation about the shaft.

9. Structure as defined in claim 1 in which the means to secure the assembly to the wall includes means to secure the body to the wall selectively with the arm below the socket, above the socket, or on either side of the socket according to direction at which the force tightening the cord is applied.

10. Structure as defined in claim 1 in which the means (b) to clamp the cord in an arm of the assembly includes
   iii. two spaced extending walls (84,85) provided at an outer end of the arm,
   iv. staggered tapered buttresses extending inwards from inner surfaces of the walls, the buttresses having sloping inner edges (91) defining v-shaped openings between the buttresses and portions of inner surfaces of the walls opposite,
   so that, when a cord is inserted between the side walls and the buttresses, the cord follows a generally sinusoidal path and is gripped in the v-shaped openings.

* * * * *